United States Patent
Baer et al.

(10) Patent No.: US 9,435,918 B2
(45) Date of Patent: Sep. 6, 2016

(54) ASPHERICAL GRIN LENS

(71) Applicant: Case Western Reserve University, Cleveland, OH (US)

(72) Inventors: Eric Baer, Cleveland Heights, OH (US); Anne P. Hiltner, Cleveland, OH (US); Michael T. Ponting, Cleveland Heights, OH (US)

(73) Assignee: Case Western Reserve University, Cleveland, OH (US)

(*) Notice: Subject to any disclaimer, the term of this patent is extended or adjusted under 35 U.S.C. 154(b) by 325 days.

(21) Appl. No.: 13/864,730

(22) Filed: Apr. 17, 2013

(65) Prior Publication Data

US 2014/0192420 A1    Jul. 10, 2014

Related U.S. Application Data

(63) Continuation-in-part of application No. PCT/US2011/056713, filed on Oct. 18, 2011.

(60) Provisional application No. 61/625,340, filed on Apr. 17, 2012, provisional application No. 61/394,059, filed on Oct. 18, 2010, provisional application No. 61/415,125, filed on Nov. 18, 2010.

(51) Int. Cl.
| | |
|---|---|
| *G02B 3/08* | (2006.01) |
| *G02B 3/00* | (2006.01) |
| *B29D 11/00* | (2006.01) |
| *B29D 11/02* | (2006.01) |
| *G02C 7/02* | (2006.01) |

(52) U.S. Cl.
CPC ....... *G02B 3/0087* (2013.01); *B29D 11/00355* (2013.01); *B29D 11/023* (2013.01); *G02C 7/02* (2013.01); *G02C 2202/22* (2013.01)

(58) Field of Classification Search
CPC ............................. G02B 3/0087; G02B 3/02
See application file for complete search history.

(56) References Cited

U.S. PATENT DOCUMENTS

| | | | |
|---|---|---|---|
| 7,002,754 B2 * | 2/2006 | Baer et al. ............ | 359/653 |
| 2005/0105191 A1 | 5/2005 | Baer | |
| 2010/0165134 A1 | 7/2010 | Dowski et al. | |

FOREIGN PATENT DOCUMENTS

| | | |
|---|---|---|
| CN | 101473439 A | 7/2009 |
| CN | 101681028 A | 3/2010 |
| JP | 1991504903 A | 10/1991 |
| JP | 1992102818 A | 4/1992 |
| JP | 2007-522484 A | 8/2007 |

OTHER PUBLICATIONS

Second Chinese Office Action dated Aug. 24, 2015.
Japanese Office Action dated Aug. 25, 2015.
(Continued)

*Primary Examiner* — Joseph P Martinez
(74) *Attorney, Agent, or Firm* — Tarolli, Sundheim, Covell & Tummino LLP (57) ABSTRACT

A method of fabricating an aspherical gradient refractive index lens includes co-extruding a first polymer material having a first refractive index and a second polymer material having a second refractive index different than the first refractive index to form multilayered polymer composite films, assembling the multilayered polymer composite films into a multilayer composite GRIN sheet and shaping the multilayered composite GRIN sheet into an aspherical lens.

20 Claims, 5 Drawing Sheets

(56) References Cited

OTHER PUBLICATIONS

Chinese Office Action dated Apr. 11, 2016.

"Modern Optics Manufacturing Technology", Xin Qiming, pp. 172-173, National Defend Industry Press, Sep. 9, 1997.
Japanese Office Action dated May 10, 2016.

* cited by examiner

ASPHERICAL GRIN LENS

RELATED APPLICATION

This application is a Continuation-in-Part of U.S. Provisional Ser. No. 61/625,340, filed Apr. 17, 2012, and PCT/US2011/056713, filed Oct. 18, 2011, which claims priority from U.S. Provisional Application Nos. 61/394,059, filed Oct. 18, 2010 and 61/415,125 filed Nov. 18, 2010, the subject matter of which are incorporated herein by reference in their entirety.

GOVERNMENT FUNDING

This invention was made with government support under Grant No, dmr-0423914 awarded by the National Science Foundation, and PO10023237, awarded by the Defense Advanced Research Projects Agency (DARPA). The United States government may have certain rights to the invention.

FIELD OF THE INVENTION

The present invention relates to gradient refractive index (GRIN) lenses and, in particular, relates to an aspherical GRIN lens that has a designer GRIN distribution.

BACKGROUND

In a conventional lens, an incoming light ray is refracted when it enters the shaped lens surface because of the abrupt change of the refractive index from air to a homogeneous lens material. The surface shape of the lens determines the focusing and imaging properties of the lens. In a GRIN lens, there is a continuous variation of the refractive index within the lens material. In a simple GRIN lens, plane optical surfaces can be used. The light rays are continuously bent within the lens. The focusing properties are determined by the variation of refractive index within the lens material.

U.S. Pat. No. 5,262,896 describes the fabrication of axial gradient lenses by the controlled diffusion process. The blanks for the fabrication of such gradient lenses can be made by a variety of processes, such as SOL-GEL, infusion, and diffusion and may be glass, plastic or other suitable optical material.

U.S. Pat. No. 4,956,000 describes a method and apparatus for fabricating a lens having a radially non-uniform but axially symmetrical distribution of lens material, in which the lens size and shape is determined by the selective direction and condensation of vaporized lens material onto a substrate.

U.S. Pat. No. 5,236,486 describes the forming of a cylindrical or spherical gradient lens blank from an axial gradient lens blank by heat molding (slumping). This process produces a monolithic lens with a continuous index of refraction profile.

U.S. Pat. No. 7,002,754 describes a hierarchically multi-layered polymer composite for graded index of refraction (GRIN) lenses and a method to fabricate the same.

SUMMARY

This application relates to an aspherical GRIN lens that has a designer GRIN distribution and to a method of fabricating the aspherical GRIN lens. The aspherical GRIN lens can include a hierarchically multilayered polymer composite and be formed in a multi-stage process. In an aspect of the application, a set of multilayered polymer composite films are fabricated, each with a different refractive index. An ordered set of these multilayered polymer composite films are assembled into a multilayered composite GRIN sheet with the desired index gradient. The multilayered composite GRIN sheet can then be shaped into an aspherical lens that has a specified GRIN distribution.

The aspherical GRIN lens described herein can be used in a wide range of applications. For example, the aspherical GRIN lens may be used in imaging applications, such as small camera applications including but not limited to camera phones, surveillance cameras, medical imaging tools (e.g., endoscopes), and military imaging (e.g., scopes, space cameras) as well as non-image forming systems, such as energy collection devices, solar cells, solar collectors, solar concentrators, beam shaping devices, and other devices that require a lens with very short or very long (infinite) focal lengths. Furthermore, the aspherical GRIN lens may be used in biological implants, such as synthetic copies of human lenses to produce implantable devices for human or animal vision. More specifically, the aspherical GRIN lens may be used to produce devices that are implantable as optical materials to improve damaged or deteriorating human vision.

Other objects and advantages and a fuller understanding of the invention will be had from the following detailed description of the preferred embodiments and the accompanying drawings.

BRIEF DESCRIPTION OF THE DRAWINGS

FIGS. 4($a$-$c$) are an example of a) GRIN sheet, b) deformability of GRIN sheet, c) shaped GRIN lens.

DETAILED DESCRIPTION

This application relates to gradient refractive index (GRIN) lenses and, in particular, relates to an aspherical GRIN lens that has a designer GRIN distribution. The aspherical GRIN lens can include a hierarchical composite structure that can be readily tailored to provide aspherical lens shapes and GRIN distributions. The aspherical lens shapes and GRIN distributions allow for larger corrections of lens aberrations and production of unique optics with performance unachievable with spherical surfaces.

In an embodiment of the application, the aspherical GRIN lens can be fabricated in a multi-stage process. In the multi-stage process, a set of multilayered polymer composite films can be fabricated. Each polymer composite film can have a different refractive index. An ordered set of these multilayered polymer composite films can be assembled into the hierarchical multilayered composite GRIN sheet with the desired index gradient. The assembled composite GRIN sheet can then be shaped into an aspherical lens with a spherical or aspheric GRIN distribution.

The multilayered polymer composite films used to form the hierarchical structure of the GRIN lens can include up to 500,000 layers alternating between at least two types: (A) and (B). Layers of type (A) are comprised of component (a) and layers of type (B) are comprised of component (b). Each of the layers (A) and (B) of the multilayered polymer composite film may have a thickness in the range of from about 5 nm to about 1,000 μm.

A wide variety of thermoplastic polymeric materials can be used to form the layers (A) and (B). Such materials include, but are not limited to glassy polymers, crystalline polymers, liquid crystalline polymers, and elastomers. The term "polymer" or "polymeric material" as used herein denotes a material having a weight average molecular weight (MW) of at least 5,000. The polymer may, for example, be an organic polymeric material. The term "oligomer" or "oligomeric material" as used herein denotes a material having a weight average MW from 1,000 to less than 5,000. Such oligomeric materials can be, for example, glassy, crystalline or elastomeric polymeric materials.

Examples of polymeric materials that can be used to form the layers A and B can include but are not limited to polyethylene naphthalate and isomers thereof, such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides, such as polyacrylic imides; polyetherimides; styrenic polymers, such as atactic, isotactic and syndiotactic polystyrene, α-methyl-polystyrene, para-methyl-polystyrene; polycarbonates such as bisphenol-A-polycarbonate (PC); poly(meth)acrylates such as glassy poly (methyl methacrylate), poly(methyl methacrylate), poly (isobutyl methacrylate), poly(propyl methacrylate), poly (ethyl methacrylate), poly(butyl acrylate) and poly(methyl acrylate) (the term "(meth)acrylate" is used herein to denote acrylate or methacrylate); cellulose derivatives, such as ethyl cellulose, cellulose acetate, cellulose propionate, cellulose acetate butyrate, and cellulose nitrate; polyalkylene polymers, such as polyethylene, polypropylene, polybutylene, polyisobutylene, and poly(4-methyl)pentene; fluorinated polymers, such as perfluoroalkoxy resins, polytetrafluoroethylene, fluorinated ethylene-propylene copolymers, polyvinylidene fluoride, and polychlorotrifluoroethylene and copolymers thereof; chlorinated polymers, such as polydichlorostyrene, polyvinylidene chloride and polyvinylchloride; polysulfones; polyethersulfones; polyacrylonitrile; polyamides; polyvinylacetate; polyether-amides.

Other polymer materials that can be used to form layers A and B are copolymers, such as styrene-acrylonitrile copolymer (SAN), for example, containing between 10 and 50 wt %, or between 20 and 40 wt %, acrylonitrile, SAN-17, styrene-ethylene copolymer; and poly(ethylene-1,4-cyclohexylenedimethylene terephthalate) (PETG). Additional polymeric materials include an acrylic rubber; electro-optic polymers, such as polyoxyethylene (EO) or polyoxypropylene (PO); tetrafluoroethylene hexafluoropropylene vinylidene (THV); isoprene (IR); isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); and urethane rubber. Still, additional polymeric materials include liquid crystalline polymers, copolymers, and block or graft copolymers.

In addition, each individual layer (A) and (B) may include blends of two or more of the above-described polymers or copolymers. The components (a) and (b) of such a blend may be substantially miscible and, thus, do not affect the transparency of the blend. Alternatively, one or more of the components (a) and (b) of the blend may be immiscible or partially miscible.

One consideration in selecting the materials for the composite GRIN sheet is the difference in refractive index between the polymeric components (a) and (b) of the layers (A) and (B). In particular, the maximum index gradient of the multilayer polymer composite and, thus, the GRIN sheet is dictated by the difference between the indexes of the polymer components (a) and (b). The focal length, the thickness, and the shape of the GRIN lens likewise depend on the index gradient that can be achieved. Accordingly, one or more of the components (a) and (b) of the composite film can include organic or inorganic materials designed to increase or decrease the refractive index of the component. The organic or inorganic materials may include, for example, nanoparticulate materials, dyes, and/or other additives.

The multilayered polymer composite films can be fabricated with a predetermined range of refractive indexes and an arbitrarily small index difference between them. This may be done, for example, by altering the relative thickness of the layers (A) and (B). In instances where the elastic modulus of the component polymers (a) and (b) differs, the refractive index of the composite can be varied mechanically via pressure, tension, compression or shear stresses or a combination of these stresses. As noted, the composite can be fabricated so that one or both of the component polymers (a) and (b) is an elastomer. If the elastic modulus of the component polymers (a) and (b) differs, then the refractive index of one or more of the effective medium composite layers (A) and (B) is variable, relative to the other, mechanically via pressure, tension, compression or shear stresses or a combination of these stresses. The index gradient of the hierarchical GRIN sheet can therefore be varied via tension, compression or shear forces. The refractive index and refractive index gradient changes can also be achieved by any type of mechanical or electrical stimulus, or by magnets attached to the multilayer polymeric composite structure. The changes can be induced by electrostatic effects or by using electroactive or electrooptic component polymers. This provides the materials with a large electro-optical response.

The multilayered polymer composite films can be fabricated by multilayered co-extrusion. For example, the multilayered polymer composite films fabricated may be formed by forced assembly co-extrusion in which two or more polymers are layered and then multiplied several times or traditional multilayer co-extrusion processing where layering is accomplished simultaneously in a single multilayered feed block. These processes can result in large area films (e.g., feet wide by yards wide) consisting of thousands of layers with individual layer thicknesses as thin as 10 nm. When the layer thickness is much less than the wavelength of light, the films behave as effective media and, thus, have unique properties compared to the constituents. The co-extruded GRIN films may have an overall thickness ranging from about 10 nm to about 10 cm, in particular from about 12 μm to about 3 cm including any increments within these ranges.

The multilayered polymer composite films comprising layer (A) and (B) can be stacked to form the hierarchical multilayered composite GRIN sheet. The GRIN sheet may, for example, be formed by layering the multilayered polymer composite films in a hierarchical structure as described and disclosed in U.S. Pat. No. 6,582,807, issued Jun. 24, 2003 to Baer et al. and U.S. Pat. No. 7,002,754, issued Feb. 21, 2006, to Baer et al, which are incorporated herein by reference in their entirety. By layering the multilayered polymer composite films, the hierarchical GRIN sheet is given a refractive index gradient. The layering can be done so that the resulting hierarchical GRIN sheet has an index gradient in any direction, such as the axial, radial or spherical direction. The index gradient can be continuous, discrete or stepped. Many gradients can be achieved within the limits imposed by the index of the component polymers (a) and (b) of the layers (A) and (B) in the multilayered polymer composite films.

In any case, adjacent multilayered polymer composite films can be chosen to exhibit progressively different refractive indexes. For example, stacking 5 to 100,000 multilayered polymer composite films will form a hierarchical GRIN sheet from which GRIN lenses can be fabricated as described below. The index gradient of the hierarchical GRIN sheet is determined by the design in which the multilayered polymer composite films are stacked. A particular advantage of this process is that any predetermined index gradient can be easily achieved using multilayered polymer composite films. The index gradient is limited only by the available refractive index range in the multilayered polymer composite films. Due to the aforementioned construction of the GRIN sheet, the sheet has a hierarchical structure on the nanometer scale, micrometer scale, and the centimeter scale.

In some embodiments of the application, the multilayer polymer composite film can be made from two alternating layers (A) and (B) (e.g., ABABA . . . ) that are formed, respectively, component polymers (a) and (b) referred to as component. The component polymers (a) and (b) can exhibit different refractive indexes and form a multilayer polymer composite film represented by formula $(AB)_x$, where $x=(2)^n$, and n is the number of multiplier elements and is in the range of from 2 to 18. In other embodiments, the alternating layers A and B can be provided in a multilayer polymer composite film represented by formula $(ABA)_x$ or $(BAB)_x$, where $x=(2)^n+1$, and n is the number of multiplier elements and is in the range of 2 to 18.

In some embodiments, polymer components (a) and (b) can be independently a glassy polymeric material, a crystalline polymeric material, an elastomeric polymeric material or blends thereof. By way of a non-binding example, when component (a) is a glassy material, component (b) can be an elastomeric material, a glassy material, a crystalline material or a blend thereof. Alternatively, when component (a) is an elastomeric material, component (b) can be an elastomeric material, a glassy material, a crystalline material or a blend thereof. Regardless, component (a) must exhibit a different refractive index than component (b); likewise, layer (A) must exhibit a different refractive index than layer (B).

The multilayered polymer composite film can include a multitude of alternating layers (A) and (B). In some examples, the multilayer polymer composite film can include at least 10 alternating layers (A) and (B), preferably from about 50 to about 500,000 alternating layers, including any increments within these ranges. Each of the layers (A) and (B) may be microlayers or nanolayers. Similarly, additional multilayered polymer composite films may be formed comprised of layers $(A_i)$ and $(B_i)$, which layers are comprised of components $(a_i)$ and $(b_i)$, respectively. The components (a) and $(a_i)$ can be the same or different polymeric materials. Likewise, (b) and $(b_i)$ can be the same or different polymeric materials. Further, components (a) and (b) may be the same materials chemically, as long as they can form distinct layers exhibiting different refractive indexes by virtue of secondary physical differences, such as conformational differences between polymeric structures, differences resulting from different processing conditions, such as orientation or MW differences.

The hierarchical GRIN sheet may alternatively include more than two different components. For example, a three component structure of alternating layers (A), (B), and (C) (e.g., ABCABCABC . . . ) of, respectively, components (a), (b), and (c) is represented by $(ABC)_x$, where x is as defined above. A structure that includes any number of different component layers in any desired configuration and combination is included within the scope of the present invention such as (CACBCACBC . . . ).

The hierarchical GRIN sheet can be formed into an aspherical lens that has any predetermined spherical or aspherically symmetric axial or radial GRIN distribution. The hierarchical GRIN sheet may be formed into an aspherical shape by heating the GRIN sheet to a temperature below the lowest melting temperature of any of the polymers within the GRIN sheet. The heated GRIN sheet can then be thermoformed in a die or mold forming the GRIN sheet into an aspherical surface shape that is maintained when the heated GRIN sheet cools. Alternatively or additionally, the hierarchical GRIN sheet can be mechanically or chemically shaped by a suitable process, such as etching, patterning, diamond machining, metallurgical polishing, glass bead honing and the like, or a combination of diamond machining followed by metallurgical polishing or glass bead honing or the like to shape the GRIN sheet into an aspherical shape configuration. In one example, the hierarchical GRIN sheet may be formed into an aspherical shape by a diamond machining process, such as Diamond turning, fly-cutting, and vibration assisted machining (VAM).

Depending on the particular polymeric construction of the aspherical GRIN lens, the lens may be non-deformable, reversibly deformable or irreversible deformable. Accordingly, by using multilayered polymer technology, the lens can be fabricated such that the gradient is varied dynamically and reversibly. This is accomplished, for example, by using dynamically variable multilayer polymeric materials as the individual layers. In particular, the polymeric materials can be fabricated such that the elastic moduli as well as the index of refraction of the alternating polymer layers are different. In these materials, applied stress, such as pressure, tension, compression or sheer stresses or a combination of these stresses, changes the relative layer thickness and, thus, changes the gradient in the lens.

The refractive index and refractive index gradient changes can also be achieved by any type of mechanical or electrical stimulus, or by magnets attached to the multilayer polymeric composite structure. The changes can be induced by electrostatic effects or by using electroactive or electrooptic component polymers. This provides the materials with a large electro-optical response. The sensitivity of the index to stress can be varied by the choice of the component polymers (a) and (b) and their relative initial thickness. Therefore, it is possible to fabricate a variable gradient lens where both the initial gradient and the variability of the gradient with stress can be predetermined.

Optionally, the gradient of the aspherical GRIN lens can varied, reversibly or irreversibly, by axially orienting (e.g., stretching) the hierarchical GRIN sheet and/or multilayered polymer composite film during and/or after fabrication. As pointed out above, the composite film and hence the hierarchical GRIN sheet can be fabricated so that one or both of the component polymers is an elastomer. Axial orientation of the multilayer polymer composite film and/or hierarchical GRIN sheet in at least one direction parallel can vary the gradient distribution of the film or sheet. In one example, a multilayer polymer composite film can be biaxially oriented by stretching the film in a plane that is substantially parallel to a surface of the film. It will be appreciated that although the film can be biaxially oriented by stretching the film in at least two directions, the film can also be stretched in a single direction (e.g., uniaxially oriented) or stretched in multiple directions (e.g., biaxially or triaxially oriented).

In fabricating GRIN lenses, it is also desirable to be able to specify the index gradient from less than 0.01 to as large as possible. With the multilayering technique described herein, a wide variety of index gradients are possible. Since a larger gradient gives a wider range of GRIN lenses that can be made, it is desirable to be able to make a large gradient. This enables a shorter focal length and more aberration correction in a thinner GRIN lens. For multilayered GRIN lenses, the index gradient can be specified from a minimum of 0.001 to a maximum of the difference in refractive index between the polymers constituting the layers. Often the largest possible range is desirable. Preferably, the lens of the multilayer polymeric structure can exhibit an index gradient of 0.01 or higher, preferably in the range of from 0.02 to 1.0, more preferably in the range of from 0.05 to 0.5, including all increments within these ranges.

An important point is that the multilayering technique described herein allows the use of miscible, immiscible or partially miscible polymers to achieve a large index difference. Other GRIN lens fabrication techniques use diffusion techniques to achieve an index gradient. Thus, the examples in the prior art are limited to small index gradients of 0.01 to 0.03.

A second important point is that multilayered lenses can be designed to be used as optical elements over a wide wavelength range from near 40 nm to 1 meter. The specific wavelength range is determined by the polymeric components. In an embodiment of the application, the multilayer polymer structure exhibits an internal transmission greater than 20%, preferably greater than 50%. A transparent multilayered polymer composite structure can be fabricated with a range of refractive indices by appropriate layering of the components. If the layer thickness of each layer is sufficiently thin the composite behaves as an effective medium. The refractive index can be designed to exhibit any value between the indexes of the component polymers by selecting the relative thickness of the component layers. Such a composite can be made with a transparency comparable to the component polymers.

The aspherical GRIN lens described herein can be used in a wide range of applications. For example, the aspherical GRIN lens may be used in imaging applications, such as small camera applications including but not limited to camera phones, surveillance cameras, medical imaging tools (e.g., endoscopes), and military imaging (e.g., scopes, space cameras) as well as non-image forming systems, such as energy collection devices, solar cells, solar collectors, solar concentrators, beam shaping devices, and other devices that require a lens with very short or very long (infinite) focal lengths. Furthermore, the aspherical GRIN lens may be used in biological implants such as synthetic copies of human lenses to produce implantable devices for human or animal vision. More specifically, the aspherical GRIN lens may be used to produce devices that are implantable as optical materials to improve damaged or deteriorating human vision. Such intraoptical lens implants would add wider field of view, improved low light resolution, high resolution imaging, and accommodation in a single implant.

Figure 1:
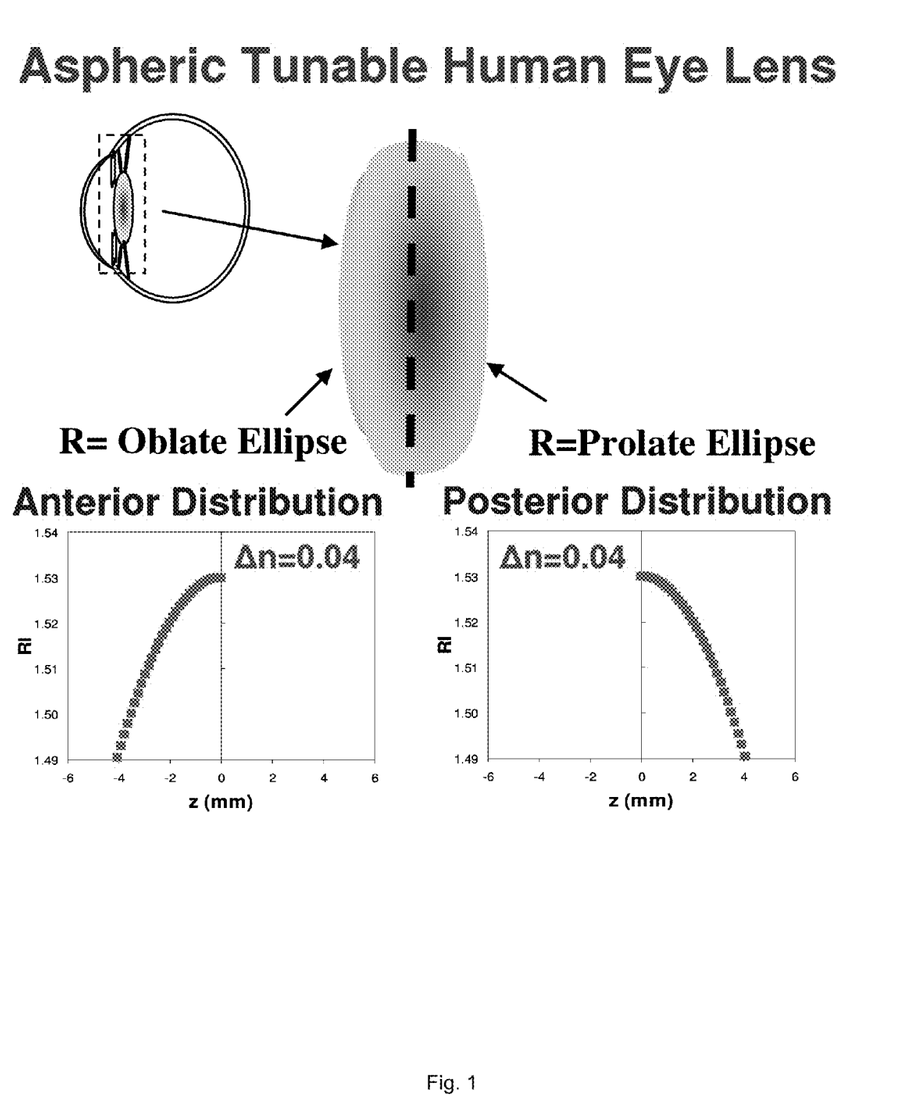
FIG. 1 is a schematic illustration multilayered composite bi-convex GRIN lens with an internal parabolic-shaped index gradient distribution; and, FIG. 2 is a plot of the compositionally dependent refractive index of deformable multilayer composite ethylene oxide/tetrafluoroethylene hexafluoropropylene vinylidene (EO/THV) polymer films based on EO volume composition.

In an embodiment of the application, the multilayered composite GRIN sheet can be used to fabricate an aspheric biconvex lens with a parabolic index gradient as shown in FIG. 1. In particular, the lens defines an oblate ellipse that has a first half-parabolic GRIN distribution and a prolate ellipse that has a second half-parabolic GRIN distribution through the lens thickness directions. In the lens shown in FIG. 1, the refractive index decreases in a direction towards the periphery of the lens. It will be understood, however, that the refractive index could likewise increase in a direction towards the periphery of the lens in accordance with the present invention. It will also be understood that the internal GRIN distribution of the lens can be designed radial and aspheric depending on the desired lens performance.

The aspherical GRIN lens is advantageous over other GRIN sheet constructions because the aspherical shape adds to the correct power of the GRIN distribution to correct wavefronts for spherical and other higher order aberrations. Furthermore, aspheric surface curvatures have the ability to modify optical wavefronts and correct for spherical or higher order aberrations inherent to commercial glass and plastic monolith lens materials. By forming nanolayered GRIN lenses with aspheric surfaces, the present invention increases the design freedom on the lenses to reduce the overall size and weight of the optical system in which the lens is used.

Example 1

Figure 2:
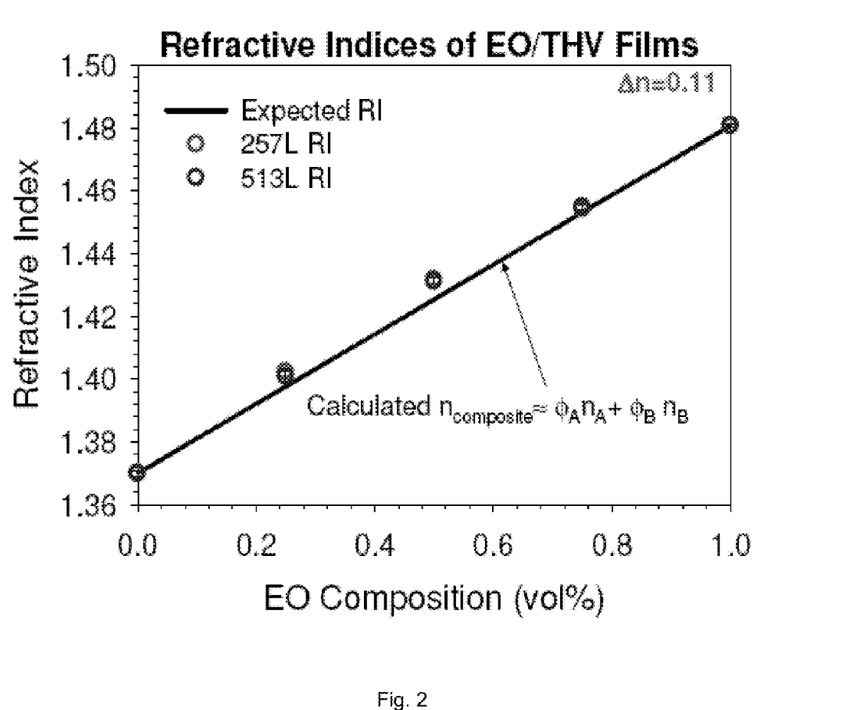

FIG. 2 is a graph illustrating one exemplary construction for the GRIN sheet made of deformable polymeric materials used to construct the aspherical GRIN lens of the present invention. In this example, a series of nanolayered elastomeric THV/EO polymer films were produced and stacked to form GRIN distributions similar to glassy PMMA/SAN-17 systems. In particular, the THV/EO stacked polymer GRIN sheet produced a refractive index range from about 1.37 to about 1.48. The change in refractive index varied with the percentage of EO by volume within each film.

Example 2

Figure 3A:
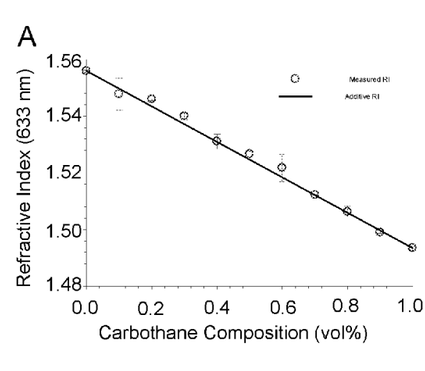
FIG. 3 illustrates optical properties of 4097-layer Carbothane/Pellethane films: a) Refractive index at 633 nm, b) Transmission at 633 nm.
Figure 3B:
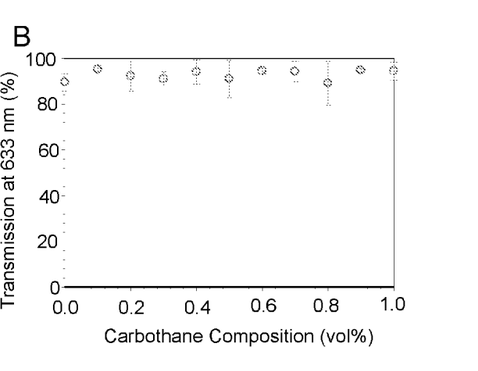
Figure 4A:
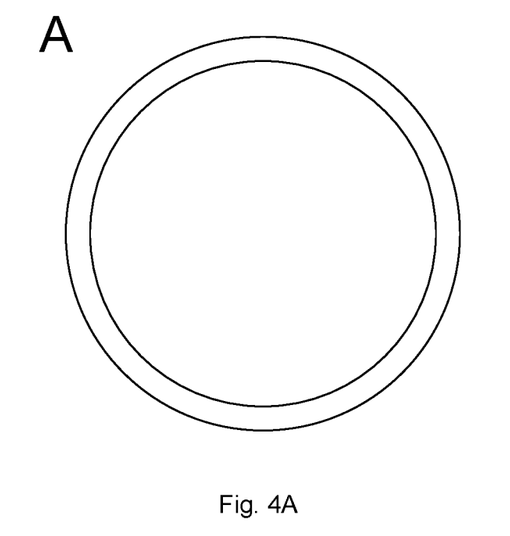
Figure 4B:
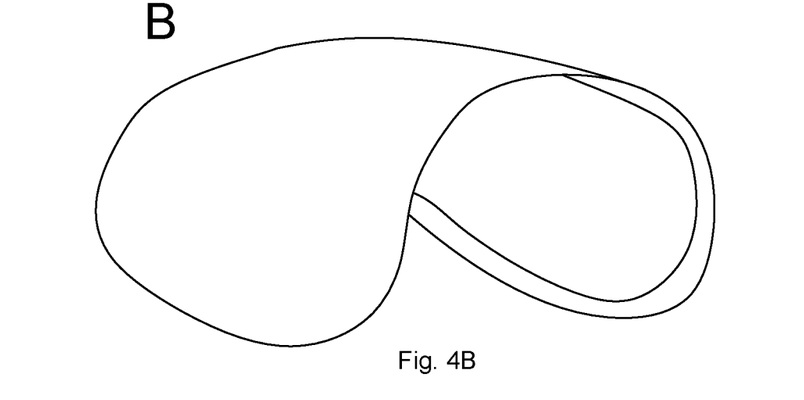
Figure 4C:
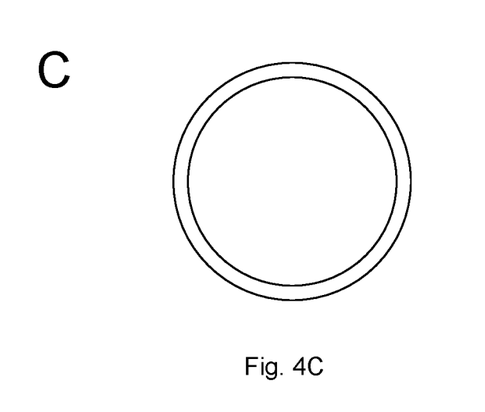

Polymeric gradient refractive index (GRIN) lenses were expanded from solely glassy based polymers to also include soft, mechanically or piezoelectrically deformable polymers. Deformable GRIN lenses provide an advantage through the ability to change/tune its radius of curvature (optical power) with mechanical deformation, much like many biological lenses. To prove concept, two elastomeric polymers were coextruded in the melt to produce nanolayered films of composition-dependent refractive index (FIG. 3a) and possessing high transmission (FIG. 3b). These films were combined together to form demonstrative, proof-of-concept gradient refractive index sheets, and shaped into soft gradient refractive index lenses, FIGS. 4(a-c), as per U.S. Pat. No. 7,002,754.

Figure 5A:
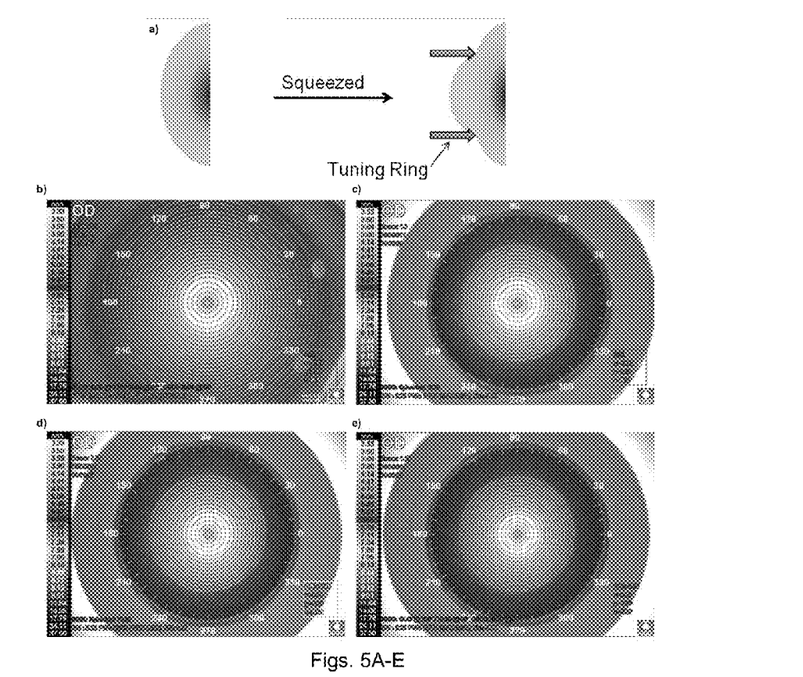
FIG. 5 illustrates preliminary curvature tunability studies of soft GRIN lens: a) compression procedure for deformation, b) R=13.59 mm, c) R=12.34 mm, d) R=11.20 mm, e) 10.43 mm.
Figure 6A:
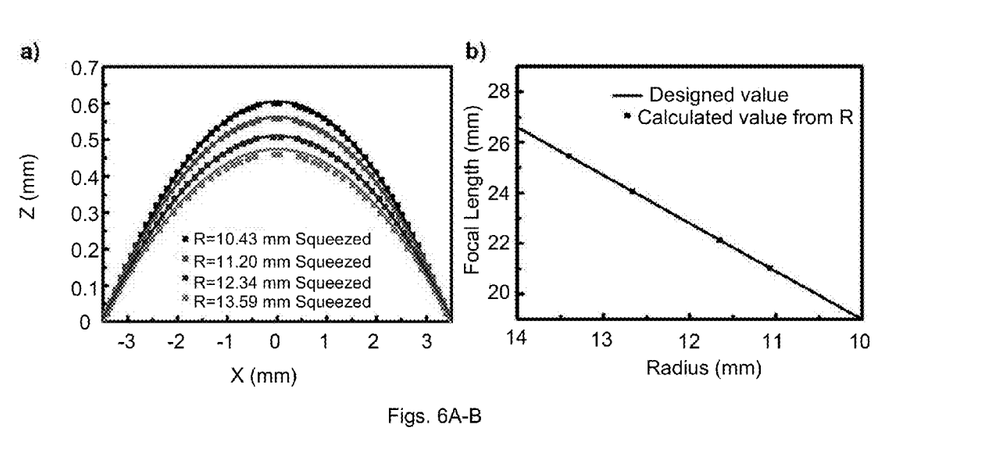
FIG. 6 illustrates the change in lens properties with compressive forces: a) radius of curvature, b) estimated focal length using a single 50/50 refractive index in calculations.

This shaped deformable GRIN lens was then placed into a compressive tuning device, and the radius of curvature was monitored using a placido-cone, FIG. 5a. The radius of curvature of this lens was able to change 3 mm with compressive forces: b) $R_1$=13.59 mm, c) R=12.34 mm, d) R=11.20 mm, and e) 10.43 mm. These radii of curvature correspond to a lens accommodation from 36 to 48 diopters, about 33% tuning. The change in radius of curvature, FIG. 5a, was utilized to calculate an estimated focal length (FIG. 5b), according to:

$$\frac{1}{f} = \frac{n-1}{R}$$

where n is represented as a single additive refractive index, $$n = \frac{n_1 + n_2}{2}$$

This above process was successfully reproduced with 2 different elastomeric polymer pairs whose properties are summarized in the Table.

TABLE

Successful elastomeric polymer pairs

| System | Polymer | RI (@ 633 nm) | Film T (@ 633 nm) | Sheet T % (@ 633 nm) | Hardness @ 100% (MPa) |
|---|---|---|---|---|---|
| System #1 $\Delta n = 0.063$ | Carbothane PC-3595A | 1.496 | (95 ± 5)% | (82 ± 3)% | 6.89 |
|  | Pellethane 2363-55DE | 1.557 | (86 ± 5)% | (75 ± 5)% | 15.9 |
| System #2 $\Delta n = 0.045$ | Carbothan PC-3595A | 1.496 | (94 ± 5)% | (82 ± 3)% | 6.89 |
|  | Texin RXT 90A | 1.541 | (91 ± 1)% | (81 ± 2)% | 11.4 |

Obviously, numerous modifications and variations of the present invention are possible in light of the above teachings. It is therefore to be understood that within the scope of the appended claims, the invention may be practiced otherwise than as specifically described herein. The preferred embodiments of the invention have been illustrated and described in detail. However, the present invention is not to be considered limited to the precise construction disclosed. Various adaptations, modifications and uses of the invention may occur to those skilled in the art to which the invention relates and the intention is to cover hereby all such adaptations, modifications, and uses which fall within the spirit or scope of the appended claims.

Having described the invention, the following is claimed:

1. A method of fabricating an aspherical gradient refractive index (GRIN) lens comprising:
   co-extruding a first polymer material having a first refractive index and a second polymer material having a second refractive index different than the first refractive index to form multilayered polymer composite films;
   assembling the multilayered polymer composite films into a multilayer composite GRIN sheet; and
   shaping the multilayered composite GRIN sheet into an aspherical lens, wherein the GRIN lens has a parabolic refractive index gradient with a vertex in an axis passing through the center of the lens and perpendicular to the optical axis.

2. The method of claim 1, wherein the GRIN sheet is thermoformed, molded, and/or machined into an aspherical GRIN lens.

3. The method of claim 1, wherein each of the multilayered polymer composite films includes a plurality of at least two alternating layers (A) and (B) represented by formula $(AB)_x$, where x=$2^n$, and n is in the range of from 2 to 18;
   wherein layer (A) is comprised of component (a) and layer (B) is comprised of component (b); and
   wherein the components (a) and (b) have different refractive indexes.

4. The method of claim 3, wherein the components (a) and (b) are selected from the group consisting of a polymeric material, a composite polymer and a polymer blend.

5. The method of claim 4, wherein the polymeric material is selected from the group consisting of a glassy material, a crystalline material, a liquid crystalline material, and an elastomeric material.

6. The method of claim 4, wherein the polymeric material comprises at least one of polyoxyethylene or tetrafluoroethylene hexafluoropropylene vinylidene (THV).

7. The method of claim 3, wherein the layers have a thickness of from 5 nm to 1,000 μm.

8. The method of claim 3, wherein the multilayered composite polymer films are stacked in ordered layers to form a hierarchical multilayered composite GRIN sheet; and wherein adjacent multilayered composite polymer films are chosen to exhibit progressively different refractive indexes.

9. The method of claim 3, wherein the multilayered composite polymer film comprises at least 10 alternating layers.

10. The method of claim 3, wherein the multilayered composite GRIN sheet is comprised of from 5 to 100,000 multilayered polymer composite films.

11. The method of claim 3, wherein components (a) and (b) are chemically the same materials.

12. The method of claim 3, wherein the layers further comprise an organic or inorganic material designed to affect the refractive index.

13. The method of claim 3, exhibiting an index gradient in the range of from 0.02 to 1.0.

14. The method of claim 13, wherein the multilayered polymer composite film or multilayered composite GRIN sheet is uniaxially or biaxially oriented.

15. A gradient index (GRIN) lens comprising:
   a co-extruded, multilayered composite GRIN sheet having an aspherical shape;
   wherein the multilayered composite sheet includes a plurality stacked co-extruded multilayered polymer composite films;
   wherein each of the multilayered polymer composite films includes a plurality of at least two alternating layers (A) and (B) represented by formula $(AB)_x$, where x=$2^n$, and n is in the range of from 4 to 18;
   wherein layer (A) is comprised of component (a) and layer (B) is comprised of component (b); and
   wherein the components (a) and (b) have different refractive indexes wherein the GRIN lens has a parabolic refractive index gradient with a vertex in an axis passing through the center of the lens and perpendicular to the optical axis.

16. The lens of claim 15, wherein the components (a) and (b) are elastomers and the multilayered composite sheet is mechanically and reversibly deformable.

17. The lens of claim 15, wherein the refractive index of the multilayered composite GRIN sheet is varied mechanically by pressure, tension, compression, shear or a combination of these stresses.

18. The lens of claim 15, exhibiting an index gradient in the range of from 0.02 to 1.0.

19. The lens of claim 15, wherein the sheet defines an oblate ellipse, which has a first half-parabolic GRIN distribution, and a prolate ellipse, which has a second half-parabolic GRIN distribution, through the lens thickness.

20. The lens of claim 19, wherein the refractive index decreases in a direction towards a periphery of the lens.

* * * * *

UNITED STATES PATENT AND TRADEMARK OFFICE
CERTIFICATE OF CORRECTION

Page 1 of 1

PATENT NO. : 9,435,918 B2
APPLICATION NO. : 13/864730
DATED : September 6, 2016
INVENTOR(S) : Eric Baer et al.

It is certified that error appears in the above-identified patent and that said Letters Patent is hereby corrected as shown below:

In the Specification

Column 1, Line 19 reads "may have" should read --has--

Signed and Sealed this
Twenty-sixth Day of December, 2017

Joseph Matal
*Performing the Functions and Duties of the
Under Secretary of Commerce for Intellectual Property and
Director of the United States Patent and Trademark Office*